(12) United States Patent
    Stoddard

(10) Patent No.: US 12,659,694 B2
(45) Date of Patent: Jun. 16, 2026

(54) METHOD AND SYSTEM FOR FREQUENCY DETERMINATION AND PROPAGATION IN A TRANSPORT CONTAINER SYSTEM

(71) Applicant: Carrier Corporation, Palm Beach Gardens, FL (US)

(72) Inventor: Paul Stoddard, Chittenango, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 160 days.

(21) Appl. No.: 18/627,834

(22) Filed: Apr. 5, 2024

(65) Prior Publication Data

US 2024/0340613 A1     Oct. 10, 2024

Related U.S. Application Data

(60) Provisional application No. 63/494,680, filed on Apr. 6, 2023.

(51) Int. Cl.
    *H04W 4/029*        (2018.01)
    *H04W 76/10*        (2018.01)
(52) U.S. Cl.
    CPC ........... *H04W 4/029* (2018.02); *H04W 76/10* (2018.02)
(58) Field of Classification Search
    CPC ..... H04W 4/029; H04W 76/10; H04W 4/021; H04W 4/70; H04W 4/80; H04W 72/0446;
    (Continued)

(56) References Cited

U.S. PATENT DOCUMENTS 9,858,523 B2    1/2018   Linkesch et al.
10,812,932 B1   10/2020  Stimpson et al.
                (Continued)

FOREIGN PATENT DOCUMENTS

CN    110290167 A    9/2019
CN    211019239 U    7/2020
                (Continued)

OTHER PUBLICATIONS

Extended European Search Report received for EP Application No. 24165584.4, mailed on Jun. 6, 2024, 7 Pages.

*Primary Examiner* — Khaled M Kassim
*Assistant Examiner* — Sriharsha Reddy Vangapaty
(74) *Attorney, Agent, or Firm* — Souad Hakim

(57)            ABSTRACT

Disclosed is a method for frequency determination and propagation in a transport container system. The method includes establishing a cellular connection with a network when a first container control device is connected to one of AC power or internal battery power. The method further includes determining whether location information of the first container control device of a plurality of container control devices is available and transmitting the location information to a web server. The method further includes receiving, from the web server, information related to an approved LoRa frequency along with a timestamp and thereby establishing a connection with a LoRa server if the LoRa frequency and the timestamp are valid. The method further includes broadcasting the LoRa frequency and a timestamp of the first container control device to a set of container control devices of the plurality of container control devices, that are not connected to the LoRa server.

14 Claims, 9 Drawing Sheets

(58) Field of Classification Search
CPC ............... H04W 4/02; H04W 72/0453; G06Q
10/0833; H04B 17/382
See application file for complete search history.

(56) References Cited

U.S. PATENT DOCUMENTS

| | | |
|---|---|---|
| 11,115,732 B2 | 9/2021 | Lucrecio et al. |
| 11,119,224 B2 | 9/2021 | Kilburn et al. |
| 11,284,228 B2 | 3/2022 | Volkerink et al. |
| 11,369,006 B2 | 6/2022 | Zubiaur et al. |
| 2018/0365636 A1 | 12/2018 | Lucrecio et al. |
| 2019/0037362 A1* | 1/2019 | Nogueira-Nine ........................... G06Q 10/0833 |
| 2021/0120523 A1* | 4/2021 | Hegde ................. H04W 64/006 |
| 2021/0350318 A1 | 11/2021 | Williamson et al. |
| 2022/0110189 A1 | 4/2022 | Volkerink et al. |
| 2022/0122436 A1 | 4/2022 | Volkerink et al. |
| 2022/0366199 A1 | 11/2022 | Volkerink et al. |

FOREIGN PATENT DOCUMENTS

| | | |
|---|---|---|
| EP | 3642641 B1 | 7/2021 |
| EP | 4021023 A1 | 6/2022 |
| WO | 2022165600 A1 | 8/2022 |
| WO | 2022178459 A1 | 8/2022 |
| WO | 2022236400 A1 | 11/2022 |

* cited by examiner

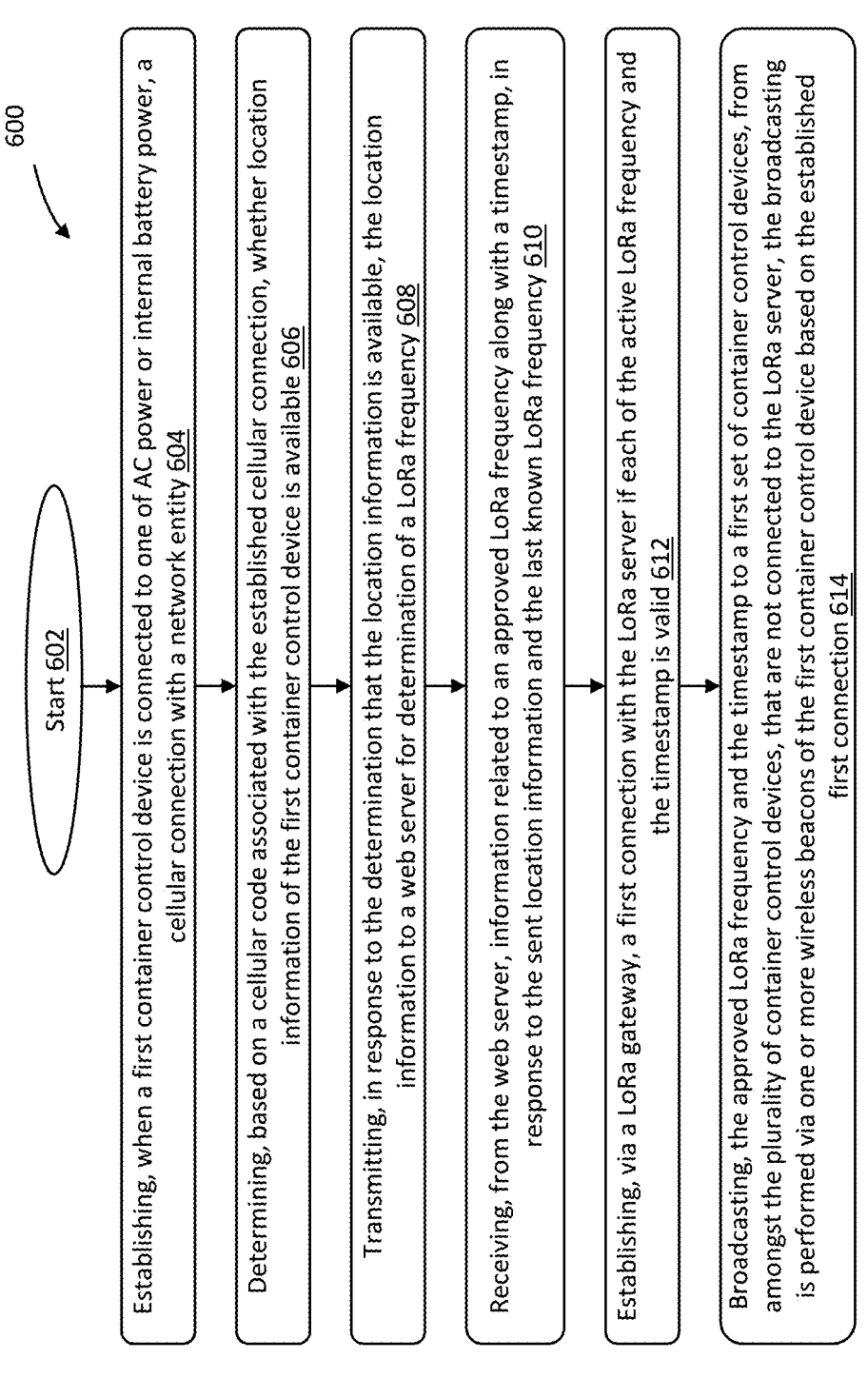

600

Start 602

Establishing, when a first container control device is connected to one of AC power or internal battery power, a cellular connection with a network entity 604

Determining, based on a cellular code associated with the established cellular connection, whether location information of the first container control device is available 606

Transmitting, in response to the determination that the location information is available, the location information to a web server for determination of a LoRa frequency 608

Receiving, from the web server, information related to an approved LoRa frequency along with a timestamp, in response to the sent location information and the last known LoRa frequency 610

Establishing, via a LoRa gateway, a first connection with the LoRa server if each of the active LoRa frequency and the timestamp is valid 612

Broadcasting, the approved LoRa frequency and the timestamp to a first set of container control devices, from amongst the plurality of container control devices, that are not connected to the LoRa server, the broadcasting is performed via one or more wireless beacons of the first container control device based on the established first connection 614

FIG. 6

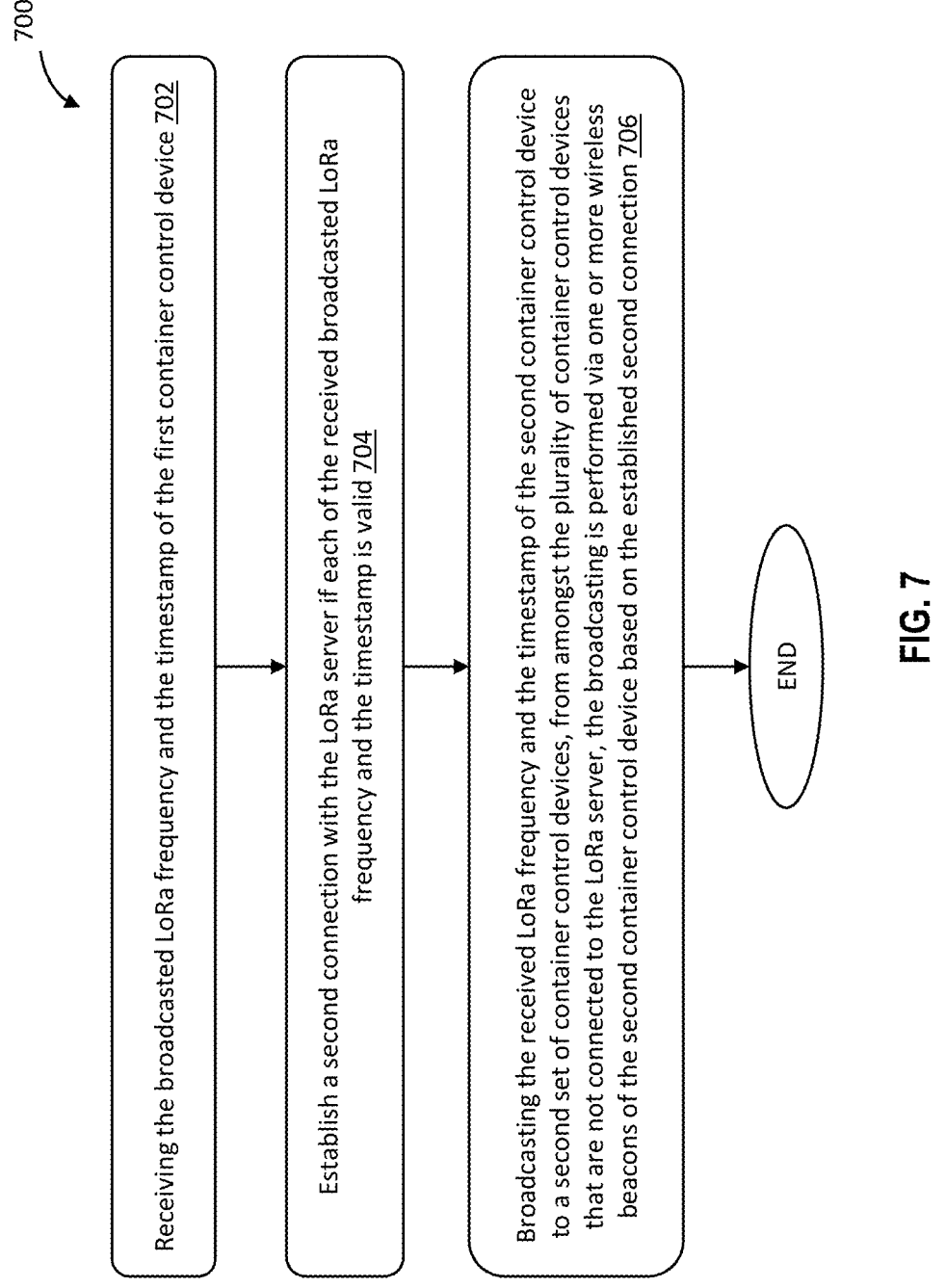

700

Receiving the broadcasted LoRa frequency and the timestamp of the first container control device 702

Establish a second connection with the LoRa server if each of the received broadcasted LoRa frequency and the timestamp is valid 704

Broadcasting the received LoRa frequency and the timestamp of the second container control device to a second set of container control devices, from amongst the plurality of container control devices that are not connected to the LoRa server, the broadcasting is performed via one or more wireless beacons of the second container control device based on the established second connection 706

END

FIG. 7

METHOD AND SYSTEM FOR FREQUENCY DETERMINATION AND PROPAGATION IN A TRANSPORT CONTAINER SYSTEM

CROSS REFERENCE TO RELATED APPLICATION

This application claims the benefit of U.S. Provisional Patent Application No. 63/494,680 filed on Apr. 6, 2023, which is incorporated by reference herein in its entirety.

FIELD OF THE INVENTION

The disclosure relates to the field of wireless communication. In particular, the disclosure relates to a method and system for determining and propagating Long Range Radio (LoRa®) frequency in a transport container system.

BACKGROUND

LoRa® wireless communication technology is a low power wide area network (LP-WAN) technology suitable for Internet of Things (IoT) and smart sensor applications. LoRa Wide Area Network (LoRaWAN®) is suitable for a wide range of industrial applications including, for instance, smart sensor-based applications, item location & tracking, shipping, transportation, as well as radiation and leak detection.

LoRa® configured devices can only transmit on specific frequencies and are not permitted legally to transmit on restricted frequencies. Geographical restrictions on frequencies are defined by corresponding countries across the globe. For example, the LoRa-configured devices may only transmit on the frequencies of 868-870 MHz and 433.05-434.79 MHz in Europe. In some of the Asian countries, the LoRa-configured devices may only transmit on 433 MHz frequency. Also, in China, the LoRa-configured devices may only transmit on 470-510 MHz frequency. Further, the LoRa-configured devices may only transmit on 779-787 MHZ frequency in Canada, on 864-870 MHz frequency in Russia, on 865-867 MHz frequency in India, and on 915 and 920 MHz frequency in North America and Australia.

Conventional methods of determination of LoRa frequencies for transport applications are based on available Global Positioning System (GPS) locations. However, in applications where GPS is not always available, it is not possible to determine LoRa frequency using conventional frequency determination methods. An example of such a system includes shipping and transportation applications where containers along with their controller(s)/LoRa® device(s) are used in environments where GPS is not always available (for e.g., inside a vessel hold).

SUMMARY

This summary is provided to introduce a selection of concepts in a simplified format that are further described in the detailed description of the invention. This summary is not intended to identify key or essential inventive concepts of the invention, nor is it intended for determining the scope of the invention.

Disclosed herein is a control system for frequency determination and propagation in a transport ship. The control system includes a plurality of container control devices, a Long Range Radio (LoRa®) server, and a web server. The LoRa server is configured to communicate with the plurality of container control devices. The web server is configured to communicate with the plurality of container control devices.

A first container control device, from amongst the plurality of container control devices, is configured to establish, when the first container control device is connected to one of AC power or internal battery power, a cellular connection with a network entity. The first container control device is further configured to determine, based on a cellular code associated with the established cellular connection, whether location information of the first container control device is available. The first container control device is further configured to transmit, in response to the determination that the location information is available, the location information to the web server. The first container control device is further configured to receive, from the web server, information related to an approved LoRa frequency along with a timestamp, in response to the transmitted location information. The first container control device is further configured to establish, via a LoRa® gateway, a first connection with the LoRa server if each of the approved LoRa frequency and the timestamp is valid. The first container control device is further configured to broadcast the approved LoRa frequency and a timestamp of the first container control device to a first set of container control devices, from amongst the plurality of container control devices, that are not connected to the LoRa server. The broadcasting is performed via one or more wireless beacons of the first container control device based on the established first connection.

In one or more embodiments, the control system may further comprise a second container control device, from amongst the first set of container control devices. The second container control device may be configured to receive the broadcasted LoRa frequency and the timestamp of the first container control device.

In one or more embodiments, the second container control device may be further configured to establish, via the LoRa gateway, a second connection with the LoRa server if each of the received broadcasted LoRa frequency and the timestamp is valid. The second container control device may be further configured to broadcast each of the received LoRa frequency and a timestamp of the second container control device to a second set of container control devices, from amongst the plurality of container control devices that are not connected to the LoRa server. The broadcasting is performed via one or more wireless beacons of the second container control device based on the established second connection. The second set of container control devices excludes the first container control device and the second container control device.

In one or more embodiments, the first container control device may be further configured to update the location information, when a new cellular connection is established based on an availability of a new cellular network connection.

In one or more embodiments, the first container control device may be further configured to transmit the updated location information to the web server. The first container control device may be further configured to receive, from the web server, information related to a newly approved LoRa frequency along with a new timestamp, in response to the sent updated location information.

In one or more embodiments, a corresponding container control device of the plurality of container control devices is installed in a corresponding container of a plurality of containers in a vessel. The newly approved LoRa frequency and the new timestamp are broadcasted from one container to other containers among the plurality of containers until each of the newly approved LoRa frequency and the new timestamp is propagated throughout the vessel.

In one or more embodiments, the first container control device may be further configured to set a LoRa frequency timer based on the established first connection with the LoRa server. The first container control device may be further configured to detect the availability of the cellular network connection after the expiry of the set LoRa frequency timer.

Also disclosed is a method for frequency determination and propagation in a transport container system. The transport container system includes a Long Range Radio (LoRa) server and a plurality of container control devices. The method comprises establishing, by a first container control device when the first container control device is connected to one of AC power or internal battery power, a cellular connection with a network entity. The method further comprises determining, by the first container control device based on a cellular code associated with the established cellular connection, whether location information of the first container control device is available. The method further comprises transmitting, by the first container control device, in response to the determination that the location information is available, the location information to a web server. The method further comprises receiving, from the web server by the first container control device, information related to an approved LoRa frequency along with a timestamp, in response to the sent location information. The method further comprises establishing, by the first container control device via a LoRa gateway, a first connection with the LoRa server if each of the approved LoRa frequency and the timestamp is valid. After establishment of the connection between the first container control device and the LoRa server, the method further comprises broadcasting, by the first container control device, the approved LoRa frequency and a timestamp of the first container control device to a first set of container control devices, from amongst the plurality of container control devices, that are not connected to the LoRa server. The broadcasting is performed via one or more wireless beacons of the first container control device based on the established first connection.

In one or more embodiments, the method may further comprise receiving, by a second container control device from amongst the first set of container control devices, the broadcasted LoRa frequency and the timestamp of the first container control device.

In one or more embodiments, the method may further comprise establishing, by the second container control device via the LoRa gateway, a second connection with the LoRa server if each of the received broadcasted LoRa frequency and the timestamp is valid. The method may further comprise broadcasting, by the second container control device, each of the received LoRa frequency and a timestamp of the second container control device to a second set of container control devices, from amongst the plurality of container control devices that are not connected to the LoRa server. The broadcasting is performed via one or more wireless beacons of the second container control device based on the established second connection. The second set of container control devices excludes the first container control device and the second container control device.

In one or more embodiments, the method may further comprise updating, by the first container control device, the location information, when a new cellular connection is established based on an availability of a new cellular network connection.

In one or more embodiments, the method may further comprise transmitting, by the first container control device, the updated location information to the web server. The method may further comprise receiving, by the first container control device from the web server, information related to a newly approved LoRa frequency along with a new timestamp, in response to the sent updated location information.

In one or more embodiments, a corresponding container control device of the plurality of container control devices is installed in a corresponding container of a plurality of containers in a vessel. The newly approved LoRa frequency and the new timestamp are broadcasted from one container to other containers among the plurality of containers until each of the newly approved LoRa frequency and the new timestamp is propagated throughout the vessel.

In one or more embodiments, the method may further comprise setting, by the first container control device, a LoRa frequency timer based on the established first connection with the LoRa server. The method may further comprise detecting, by the first container control device, the availability of the cellular network connection after the expiry of the set LoRa frequency timer.

To further clarify the advantages and features of the method and system, a more particular description of the method and system will be rendered by reference to specific embodiments thereof, which are illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein:

FIG. 6 illustrates a flow chart of a method for LoRa frequency determination and propagation performed by a first container control device of the control system;

FIG. 7 illustrates a flow chart of a method of LoRa frequency determination and propagation performed by a second container control device of the control system;

Figure 1:
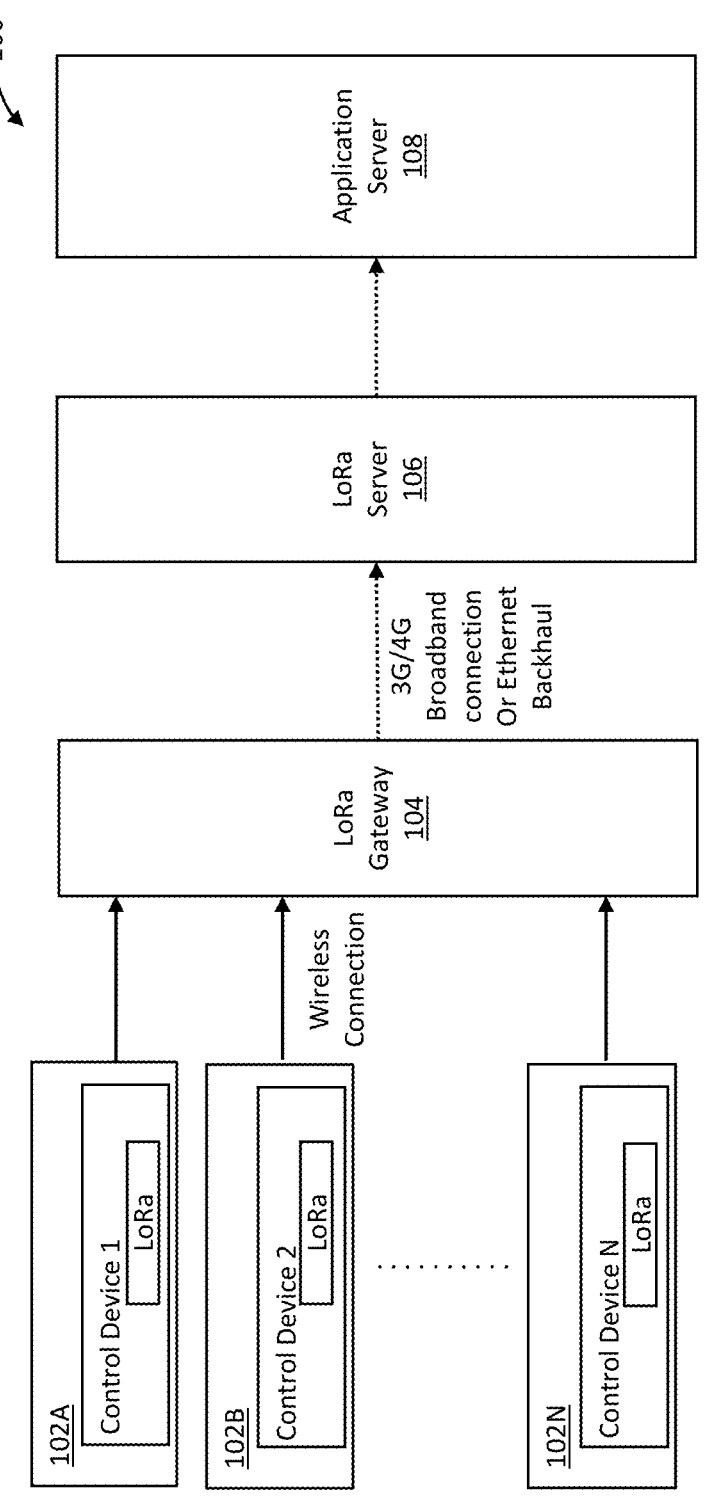
FIG. 1 illustrates a conventional LoRa communication system.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the invention. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having the benefit of the description herein.

DETAILED DESCRIPTION

It should be understood at the outset that although illustrative implementations of embodiments are illustrated below, the system and method may be implemented using any number of techniques. The disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "one, or more than one, or all." Accordingly, the terms "one," "one or more," but not all" or "all" would all fall under the definition of "some." The term "some embodiments" may refer to one embodiment or one or more embodiments or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes", "comprises", "comprise", "comprising", "has", "have", and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "needs to include."

The term "module" used herein may imply a module including, for example, one of hardware, software, and firmware or a combination of two or more of them. The "module" may be interchangeably used with a term such as logic, a logical block, a component, a circuit, and the like. The "module" may be a minimum system component for performing one or more functions or may be a part thereof.

The term "Approved LoRa Frequency" may refer to a frequency determined by an external device, a web server, a website, a Wireless Fidelity (Wi-Fi®) beacon, a Bluetooth® beacon, or a LoRa® server.

The term "Last Known LoRa frequency" may refer to a frequency that was active at one point in time and was not timed out. This may be used again without first checking the external sources, the web server, or other devices for an approved frequency i.e., an acceptable frequency.

The term "Active LoRa Frequency" may refer to a frequency that is currently in use via an established connection to the LoRa Server.

Unless otherwise defined, all terms, and especially any technical and/or scientific terms, used herein may be taken to have the same meaning as commonly understood by one having ordinary skill in the art.

Embodiments will be described below in detail with reference to the accompanying drawings.

FIG. 1 illustrates a conventional LoRa® communication system 100, in accordance with a prior-art. The LoRa communication system 100 includes a plurality of devices 102a-102n (interchangeably referred to as 102 hereinafter), a LoRa® gateway 104, a LoRa® server 106, and an application server 108. The plurality of devices 102 may include, for instance but not limited to, end nodes, sensor devices, or IoT devices. The plurality of devices may be connected to the gateway 104 via a single-hop wireless connection. The gateway 104 is a transparent bridge for forwarding messages between the LoRa server 106 and the plurality of devices 102. The gateway 104 is connected to the corresponding LoRa server via 3G/4G broadband connection or Ethernet® backhaul.

In the conventional LoRa communication system 100, a message transmitted by any of the devices 102a, 102b, . . . , 102n among the plurality of devices 102 is received by the gateway 104. The received messages are forwarded to the LoRa server 106 for processing. One or more transceivers which are configured with LoRa devices may be embedded into the devices 102 for industry applications.

The gateway 104 may correspond to a software/hardware architecture that may carry out communication in the LoRa communication system 100. The gateway 104 may also act as a smart hub between the plurality of devices 102 and the LoRa server 106. The gateway 104 is configured to control reception and transmission of messages or information between the LoRa server 106 and the plurality of devices 102 via one of the Wi-Fi, the Ethernet, or cellular communication.

The LoRa server 106 may be responsible for network management functions like over-the-air activation, data de-duplication, dynamic frame routing, adaptive rate control, traffic management, and administration. The LoRa server 106 may also send the information to the application server 108 which interprets data collected by the plurality of devices 102 and manages applications that are installed on the plurality of devices 102. The communications between the gateway 104 and the plurality of devices 102 are distributed over different frequency channels at different data rates. Spread-spectrum technology prevents communication at different data rates from interfering with each other and creates a series of "virtual" channels that may increase the capacity of the gateway 104.

A network architecture of devices configured with LoRa uses different regional frequency ranges in an Industrial, Scientific and Medical (ISM) radio band, and a Short-Range Device (SRD) band. Further, a limitation associated with these devices is that these devices use only specific frequencies and are not permitted legally to transmit on restricted frequencies. These frequency restrictions are defined by most countries across the globe. The frequencies for the LoRa devices are determined based on available GPS location. However, in applications where LoRa devices are used in environments where GPS is not always available, it is difficult to determine the LoRa frequency. An example of such environments includes, but not limited to, inside the vessel hold in shipping and transportation application.

Figure 2:
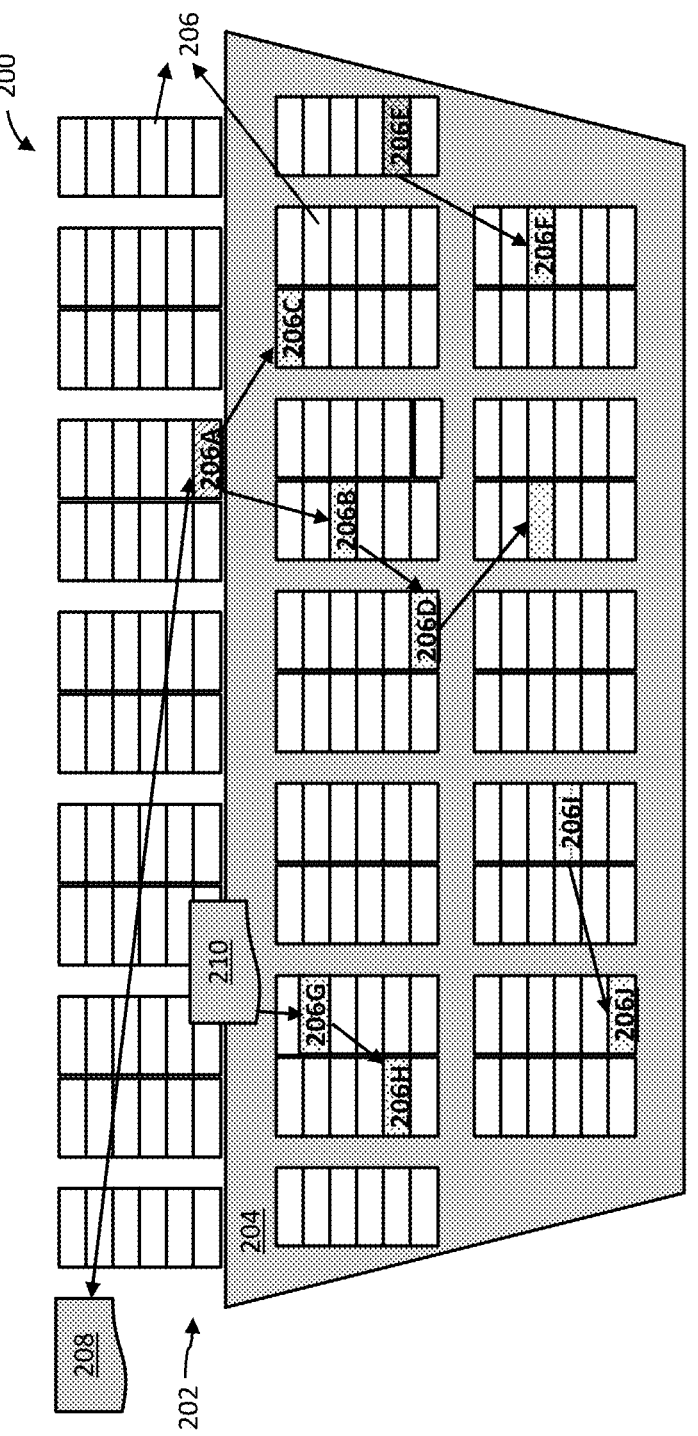
FIG. 2 illustrates a vessel system for LoRa frequency determination and propagation.

FIG. 2 illustrates a vessel system 200 for LoRa frequency determination/propagation. The vessel system 200 may include a vessel 202 that includes a plurality of containers 206A-206J (interchangeably referred to as 206 hereinafter). The plurality of containers 206 is placed upon the vessel's deck and inside the vessel hold 204. Each container of the plurality of containers 206 includes a container control system. The vessel system 200 further includes a web server 208 and a LoRa server 210. For the containers 206 inside the vessel hold 204, the GPS may not always be available.

According to one or more embodiments disclosed herein, a method to determine and propagate the LoRa frequency for the plurality of containers 206 inside the vessel hold 204 of the vessel 202 is described below by referring to the vessel system 200.

Communication technologies such as Bluetooth® and Wi-Fi® have broadcast features that allow other devices to listen to or detect information without being connected to those devices. The method and system as disclosed herein may utilize the aforesaid feature of the Bluetooth and the Wi-Fi technologies to propagate the LoRa frequency to all the LoRa devices on the vessel 202. The Bluetooth and Wi-Fi technologies are short range wireless technologies as compared to LoRa. Since these are short range, these technologies do not have as many restrictions as LoRa. Further, for Bluetooth and Wi-Fi technologies, any interference is very localized.

Generally, the AC power supply is available on the vessel as well as on the dock. When the plurality of containers 206 is on the dock, the plurality of containers 206 are connected to the AC power supply. When the plurality of containers 206 is moved from the dock to the vessel 202, the AC power is unplugged. After the plurality of containers 206 is placed into the vessel 202, the AC power supply is plugged up manually by a user. The manual re-plugging of the AC power supply takes some time due to a large number of containers being moved. When the AC power supply is removed, the plurality of containers 206 wakes up using internal battery power. According to an embodiment of the disclosure, as a non-limiting example, the AC power supply may be unplugged for as long as 6 hours. During this period, as a non-limiting example, the one or more container control devices of the plurality of containers 206 may wake up every hour using the internal battery power and sends its location information including GPS location to a web server 208 (as shown in FIG. 2). Thus, it's very likely that more than one container on the vessel 202 would have timely information regarding the location and LoRa frequency based on the location information when the plurality of containers is on the AC power supply as well as on the internal battery power. According to an exemplary embodiment, timely information means that a specific time period has elapsed since the location was determined and the container is not moved far enough in a specific time period to another LoRa frequency zone. The web server 208 may receive the location information and transmits the LoRa frequency and the timestamp to the container control devices of the plurality of containers 206. As a non-limiting example, as illustrated in FIG. 2, a container 206A may periodically transmit the location information of the container 206A to the web server 208. The web server 208 may also transmit the LoRa frequency and the timestamp to the container control device of container 206A.

When the container control device of the container 206A loses cellular connection and has the timely LoRa frequency information, the container control device of the container 206A immediately connects to the LoRa server 210, if available. Once the container control device of the container 206A connects with the LoRa server 210, then a LoRa frequency and a timestamp of the container control device of the container 206A are broadcasted securely or insecurely via the Bluetooth and/or the Wi-Fi. Other container devices of other containers that are in range and not already connected to the LoRa server 210 will be listening for the LoRa frequency broadcast via the Bluetooth and/or Wi-Fi. If the LoRa frequency and the timestamp broadcasted by the container control device of the container 206A are valid, the listening container control devices attempt to connect to the LoRa Server 210 using the LoRa frequency and the timestamp broadcasted by the container control device of the container 206A. For example, when the cellular connection is lost, the container 206A connects with the LoRa server 210 and broadcasts its LoRa frequency and timestamp securely or insecurely via the Bluetooth and/or the Wi-Fi. The container control devices of the containers 206B and 206C may listen to the LoRa frequency and the timestamp broadcasted by the container 206A and connect with the LoRa server 210, if the LoRa frequency and the timestamp are valid.

The validity of the LoRa frequency broadcasted by the container control device of the container 206A may be determined based on a determination whether the broadcasted LoRa frequency corresponds to a predefined standard LoRa frequency associated with the one or more geographical locations. Further, the validity of the timestamp broadcasted by the container control device of the container 206A may be determined based on a determination whether the broadcasted timestamp has been expired or not. For example, the LoRa frequency broadcasted by the container control device of the container 206A may be determined as valid only in a case where it is determined that the broadcasted LoRa frequency is the same as the predefined standard LoRa frequency or the broadcasted LoRa frequency is in a range of the predefined standard LoRa frequency. Further, the timestamp broadcasted by the container control device of the container 206A may be determined as valid only in a case where the broadcasted timestamp has not been expired. The expiry time of the broadcasted timestamp may be configurable and may be set based on user input. In a non-limiting example, the expiry time of the broadcasted timestamp may be in a time range of 4 to 6 hours.

If the connection to the LoRa server 210 is successful, the listening container control devices start broadcasting their LoRa frequencies and timestamps securely or insecurely via the Bluetooth and/or the Wi-Fi. The broadcasting process continues until a valid LoRa frequency is propagated to all the container control devices throughout the vessel 202. However, if a container control device does not have timely LoRa frequency information, the container control device shall not transmit the LoRa frequency information via the Bluetooth and/or the Wi-Fi. For example, as illustrated in FIG. 2, the container control device of the container 206A broadcasts its LoRa frequency and timestamp. The container control device of the container 206B listens to the LoRa frequency and the timestamp broadcasted by the container control device of the container 206A, and connects to the LoRa server 210. The container control device of the container 206B then propagates its LoRa frequency and timestamp to a container control device of the container 206D and so on. Further, a container control device of the container 206E which has already established a LoRa connection with the LoRa server 210 may also propagate its LoRa frequency and timestamp to a container control device of the container 206F via the Bluetooth and/or the Wi-Fi.

The LoRa server 210 is equipped with the Wi-Fi or the Bluetooth. The LoRa server 210 may also transmit its LoRa frequency via the Bluetooth and/or the Wi-Fi for each of the container control devices within a range of the LoRa server 210. Other container control devices which are in the range of the LoRa server 210 and are not already connected to the LoRa server 210 may listen to the LoRa frequency broadcasted by the LoRa server 210. If the LoRa frequency and the timestamp broadcasted by the LoRa server 210 are valid and received timely within a predefined threshold time period, the listening container control devices may make an attempt to connect to the LoRa Server 210 using the LoRa frequency and the timestamp broadcasted by the LoRa server 210. For example, as illustrated in FIG. 2, the LoRa server 210 broadcasts the LoRa frequency and the timestamp to the container control device of the container 206G. The container control device of the container 206G listens to the LoRa frequency and the timestamp broadcasted by the LoRa server 210 and connects to the LoRa server 210, if the LoRa frequency and the timestamp broadcasted by the LoRa server 210 are valid. The container control device of the container 206G then propagates its LoRa frequency and timestamp to the container control device of the container 206H. Further, the container control device of the container 206H listens to the LoRa frequency and the timestamp broadcasted by the container control device of the container 206G to connect with the LoRa server 210.

Figure 3:
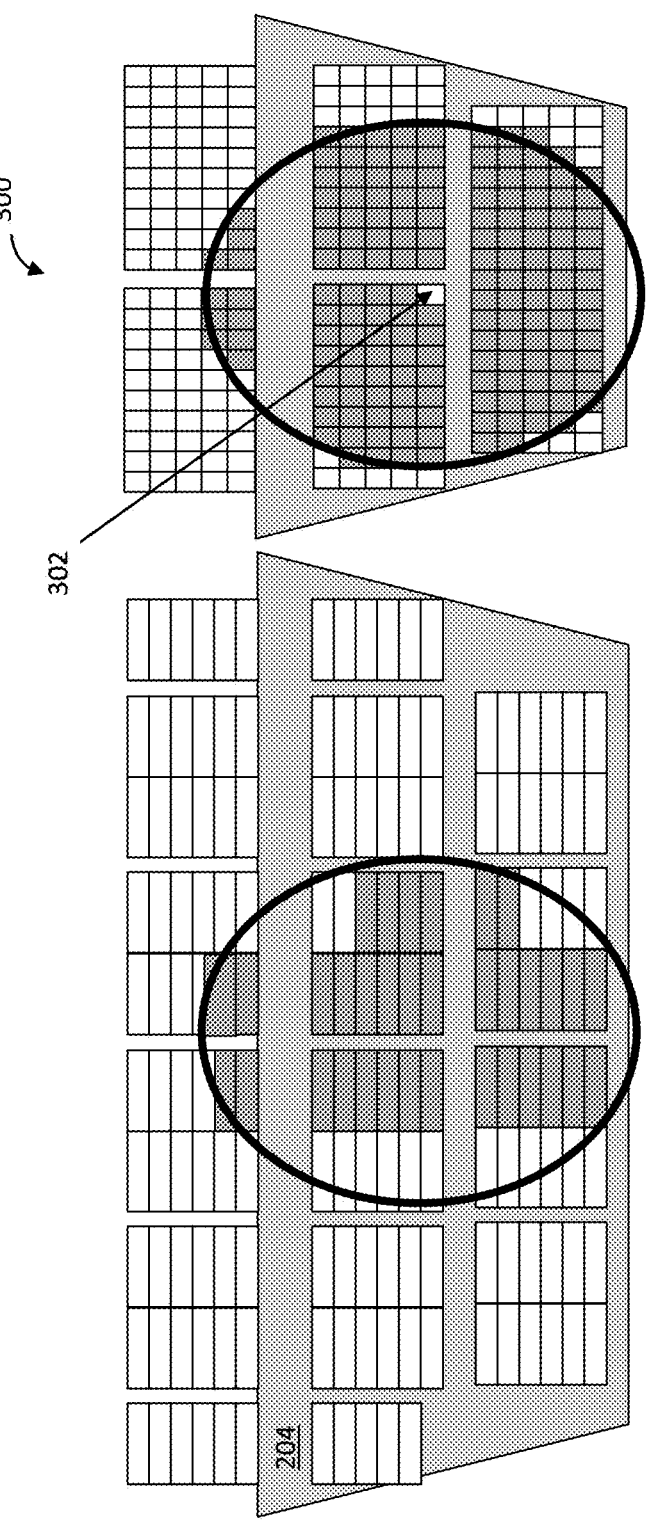
FIG. 3 illustrates a visualization of propagation of LoRa frequency by a BLE beacon in the vessel system.

FIG. 3 illustrates a visualization of the propagation of LoRa frequency by a Bluetooth Low Energy (BLE) beacon. The containers are densely packed on the vessel 202 and each container may have over 300 containers within its Bluetooth reach. As illustrated, the container control device of the container 302 is already connected to the LoRa server 210. When a LoRa frequency and a timestamp of the container control device of the container 302 are broadcasted securely or insecurely via the Bluetooth, over 300 containers which are in the Bluetooth range of the container control device of the container 302 (as shown by a circle) may listen and receive the LoRa frequency and the time-stamp broadcasted by the container control device of the container 302.

Figure 4:
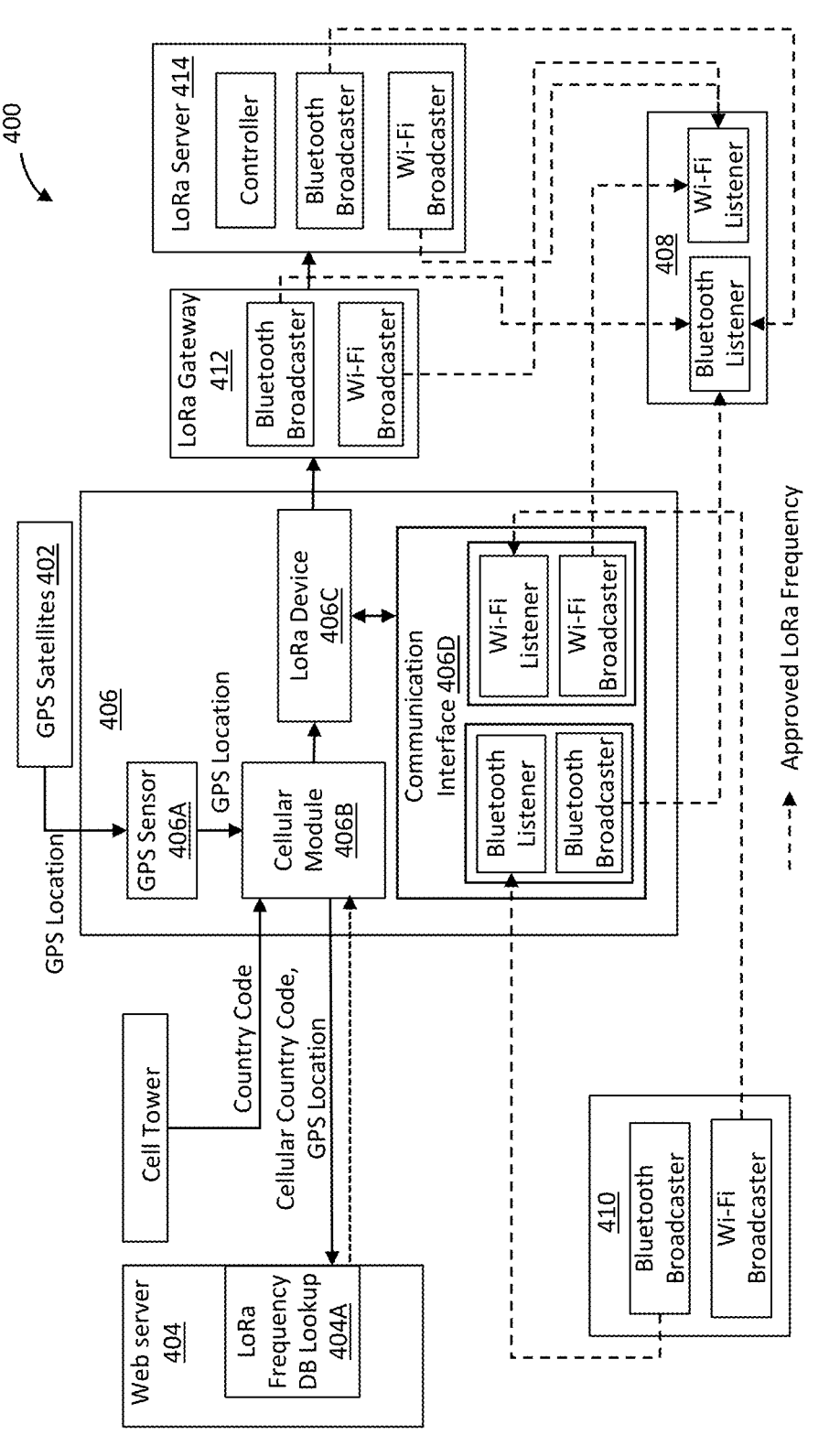
FIG. 4 illustrates a block diagram of a control system for performing LoRa frequency determination and propagation.

FIG. 4 illustrates a block diagram of a control system 400 for LoRa frequency determination and propagation. The control system 400 includes a web server 404, a plurality of container control devices (e.g., 406-410), a LoRa gateway 412, and a LoRa server 414. As a non-limiting example, the plurality of container control devices 406-410 includes a first container control device 406, a second container control device 408, and a third container control device 410. Although in the current figure, three container control devices have been depicted, it may be apparent to a person skilled in the art that there may be less than or more than three such devices.

The webserver 404 and LoRa server 414 are to be understood to be equivalent to the webserver 208 and LoRa server 210 respectively, as used in the vessel system 200. Hereinafter, the webserver 208 and LoRa server 210 may be interchangeably referred to the webserver 404 and LoRa server 414 respectively, without deviating from the scope of the disclosure.

The first container control device 406, the second container control device 408, and the third container control device 410 may also be referred to as "the container control device 406, the container control device 408, and the container control device 410" without deviating from the scope of the present invention.

The web server 404 performs the determination of which LoRa frequency to be used if cellular communication is available. The web server 404 includes a LoRa frequency database lookup 404A. The web server 404 may determine the LoRa frequency for an identified location of the container by referring to the LoRa frequency database lookup 404A. The location of the containers is identified based on the location information that includes at least one of the GPS locations of the container or cellular country code provided by the container control devices. The web server 404 then transmits the LoRa frequency and the timestamp to the container control device 406. The timestamp indicates a specific time instance at which the LoRa frequency was obtained by the container control device 406. When the specific time instance at which the LoRa frequency was obtained is greater than a predefined time threshold (e.g., more than 6 hours ago), the container control device 406 may have moved to a new location and the LoRa frequency may not be a valid LoRa frequency. Accordingly, in such a case, the container control device 406 may not make an attempt to connect with the LoRa server 414.

The container control device 406 includes a GPS sensor 406A, a cellular module 406B, a LoRa device 406C, and a communication interface 406D. The communication interface 406D includes a Bluetooth broadcaster, a Wi-Fi broadcaster, a Bluetooth listener, and a Wi-Fi listener. The container control device 406 is associated with a first container of the plurality of containers 206 as discussed previously in conjunction with FIG. 2. The GPS sensor 406A receives the GPS location of the first container from a GPS satellite(s) 402. The GPS sensor 406A transmits the GPS location to the cellular module 406B. The cellular module 406B may be an IoT based cellular module configured to transmit and receive radio signals from cellular networks. The cellular module 406B receives the GPS location from the GPS sensor 406A and receives a cellular country code associated with the location of the first container from a cell tower connected with the first container. Then, the cellular module 406B sends the location information to the web server 404. The location information may include at least one of the received GPS locations and the cellular country code.

The cellular module 406B then receives the LoRa frequency and the timestamp from the web server 404 based on the at least one of the received GPS locations and the country code.

When the container control device 406 loses the cellular connection and has information regarding the LoRa frequency and the timestamp received from the web server 404, the container control device 406 connects with the LoRa server 414 via the LoRa gateway 412. Once the first container control device 406 is connected with the LoRa server 414, the LoRa frequency and the timestamp of the first container control device 406 may be broadcasted securely or insecurely via the Bluetooth broadcaster and/or the Wi-Fi broadcaster of the communication interface 406D. Other container control devices that are in range of the container control device 406 and are not already connected to the LoRa server 414 may be listening for the LoRa frequency broadcasted by the container control device 406. If the LoRa frequency and the timestamp broadcasted by the container control device 406 are valid and received timely within the predefined threshold time period, the listening container control devices may utilize the LoRa frequency and the timestamp broadcasted by the container control device 406 to connect with the LoRa Server 414.

In one or more embodiments, when a new cellular network connection is available, the cellular module 406B establishes a new cellular connection with a new cell tower. The cellular module 406B then receives updated location information from the newly connected cell tower via the new cellular connection. The cellular module 406B sends the updated location information to the web server 404. The cellular module 406B then receives, from the web server 404, information related to a newly approved LoRa frequency along with a new timestamp, in response to the sent updated location information. The first container control device 406 may then connect with the LoRa server 414 using the newly approved LoRa frequency and the new timestamp.

Further, the container control device 406 may broadcast the newly approved LoRa frequency and the new timestamp securely or insecurely using the Bluetooth broadcaster and/or the Wi-Fi broadcaster of the communication interface 406D. Other container control devices (e.g., 408) that are in range of the container control device 406 and are not already connected to the LoRa server 414 may be listening for the newly approved LoRa frequency that is broadcasted by the container control device 406. If the newly approved LoRa frequency and the new timestamp are valid and timely, the listening container control devices (e.g., 408) may utilize the newly approved LoRa frequency and the timestamp to make an attempt to connect to the corresponding containers on the vessel 202 with the LoRa Server 414. In this way, the newly approved LoRa frequency is propagated through all the container control devices (devices associated with each of the plurality of containers 206) which are in the vicinity of the container control device 406 and do not have information about the newly approved LoRa frequency. The propagation of the newly approved LoRa frequency continues until the newly approved LoRa frequency is propagated to all of the container control devices in/on the vessel 202.

In one or more embodiments, the first container control device 406 sets the LoRa frequency timer based on the established first connection with the LoRa server 414. The first container control device 406 further detects the availability of the cellular network once the set frequency timer has expired.

Although not shown in FIG. 4, the second container control device 408 may also include a GPS sensor, a cellular module, a LoRa device, a Bluetooth broadcaster, a Wi-Fi broadcaster in addition to the Bluetooth listener and the Wi-Fi listener. The functionalities of the components of the second container control device 408 are the same as that of the components of the first container control device 406, and therefore, a detailed description of the same is omitted herein for the sake of brevity of the disclosure.

Further, the container corresponding to the second container control device 408 may not be connected to the LoRa server 414. However, the second container control device 408 may be within the Bluetooth and/or the Wi-Fi reach of the first container control device 406. In such a case, the second container control device 408 may listen to the LoRa frequency and the timestamp broadcasted by the first container control device 406 and connect with the LoRa server 414 if the broadcasted LoRa frequency and the timestamp are valid.

Although not shown in FIG. 4, the third container control device 410 may also include a GPS sensor, a cellular module, a LoRa device, a Bluetooth listener, and a Wi-Fi listener in addition to the Bluetooth broadcaster and the Wi-Fi broadcaster. The functionalities of the components of the third container control device 410 are the same as that of the components of the first container control device 406, and therefore, a detailed description of the same is omitted herein for the sake of brevity of the disclosure.

In one or more embodiments, the third container control device 410 has an established LoRa connection and a container corresponding to the third container control device 410 is within the Bluetooth and/or the Wi-Fi reach of the first container control device 406. In such a case, the first container control device 406 may listen to the LoRa frequency and the timestamp broadcasted by the third container control device 410 and connect with the LoRa server 414, if the broadcasted frequency and the timestamp are valid.

LoRa gateway 412 has a software/hardware architecture that acts as a medium for performing communication operations in the control system 400. The LoRa gateway 412 may also act as a smart hub between the first container control device 406 and the LoRa server 414. The LoRa gateway 412 is configured to control the transmission and the reception of messages or information from/to the LoRa server 414 via the Wi-Fi, the Ethernet, or the cellular connection. The LoRa gateway 412 may also include a Bluetooth broadcaster and a Wi-Fi broadcaster. The LoRa gateway 412 is further configured to transmit, using one of the Bluetooth broadcaster and/or the Wi-Fi broadcaster, LoRa frequency information associated with the LoRa gateway 412 to the second container control device 408 within the reach of the LoRa gateway 412.

The LoRa server 414 controls an application server that analyzes data collected by the plurality of container control devices and manages application on the plurality of container control devices. The LoRa server 414 is also equipped with a Wi-Fi broadcaster and a Bluetooth broadcaster. The LoRa server 414 may also transmit its LoRa frequency information to the containers within its reach via one of the Bluetooth broadcaster and/or the Wi-Fi broadcaster. Other containers which are in range of the LoRa server 414 and are not already connected to the LoRa server 414 may also listen to the LoRa frequency broadcasted by the LoRa server 414. If the LoRa frequency and the timestamp broadcasted by the LoRa server 414 are valid and received timely within the predefined threshold time period, the listening containers may utilize the broadcasted LoRa frequency and the timestamp to make an attempt to connect to the LoRa server 414.

Figure 5:
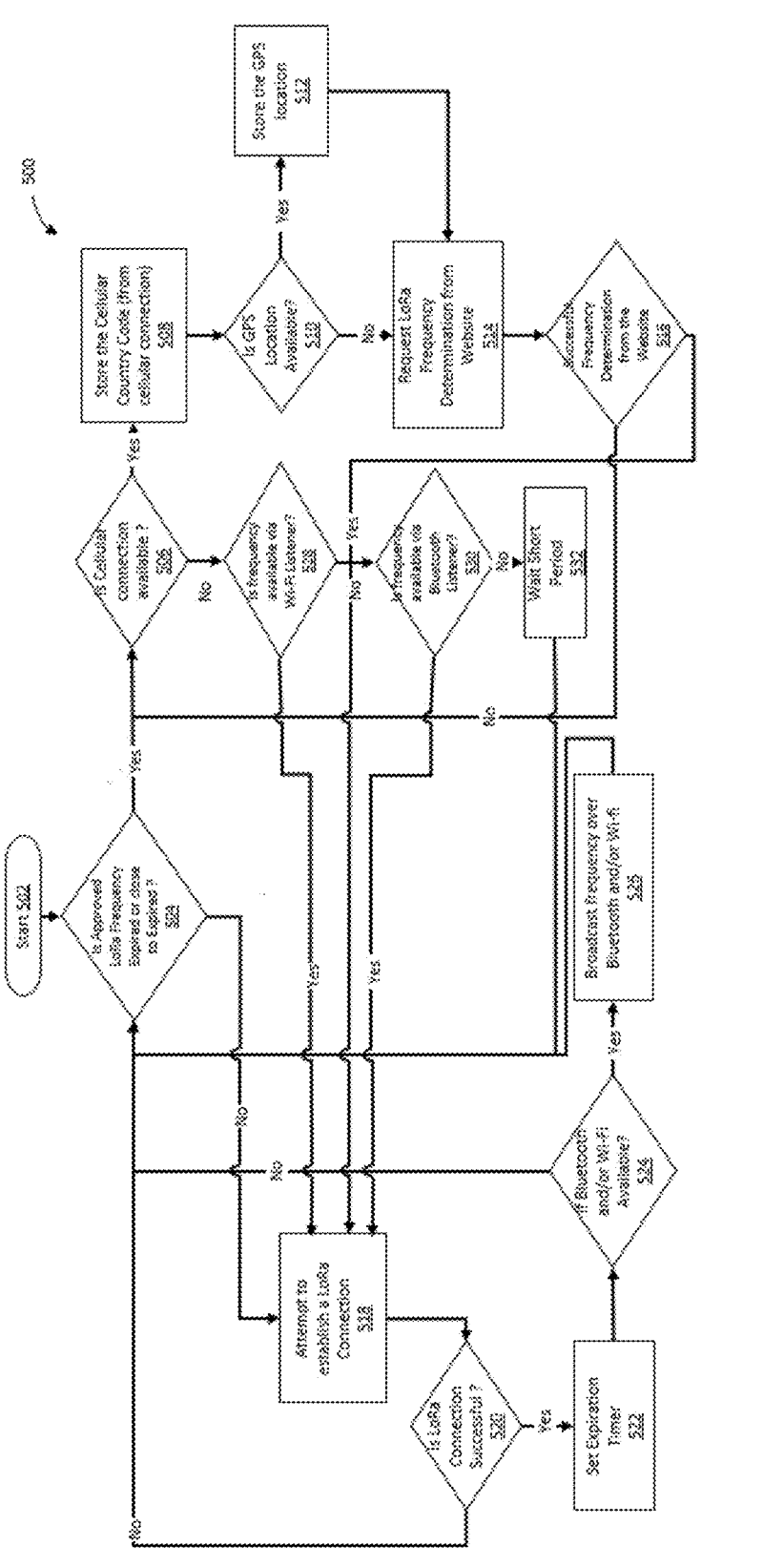
FIG. 5 illustrates a flow chart of a method for LoRa frequency determination and propagation by a container control device of the control system.

FIG. 5 illustrates a flow chart of a method for LoRa frequency determination and propagation, that is executed by the first container control device 406.

At step 502, the plurality of containers 206 are moved from the dock to the vessel 202 and are connected to one of the AC power or the internal battery power.

At step 504, the first container control device 406 determines whether a last known LoRa frequency or a last approved LoRa frequency is expired or close to an expiry time. For example, the first container control device 406 determines whether the frequency timer is expired. The frequency timer is associated with a frequency stagnation timeout. If it is determined that a last known LoRa frequency or the last approved LoRa frequency is expired or close to the expiry time, the flow of the method 500 proceeds to step 506.

At step 506, in response to the determination that the LoRa frequency timer is expired, the first container control device 406 further determines whether a cellular connection is available. If it is determined that the cellular connection is available, the flow of the method 500 proceeds to step 508. Further, if it is determined that the cellular connection is not available, the flow of the method 500 proceeds to step 528.

At step 508, the first container control device 406 establishes the cellular connection with a network entity based on the determination that the cellular connection is available. For establishing the cellular connection with the network entity, the first container control device 406 obtains a cellular country code from a cell tower connected with the first container control device 406.

At step 510, the first container control device 406 determines whether a GPS location of the first container control device 406 is available. If it is determined that the GPS location is available, then the flow of the method 500 proceeds to step 512. Further, if it is determined that the GPS location is not available, then the flow of the method 500 directly proceeds to step 514.

At step 512, the first container control device 406 obtains the GPS location from the GPS sensor 406A, if the GPS location is available. The flow of the method 500 now proceeds to step 514.

At step 514, the first container control device 406 requests the web server 404 for performing the LoRa frequency determination. Further, the first container control device 406 transmits location information to the web server 404. The location information includes at least one of the cellular country code of the currently available cellular connection or the GPS locations. The flow of the method 500 now proceeds to step 516.

At step 516, the first container control device 406 determines whether the LoRa frequency determination is successful or not. In case of a successful determination of the LoRa frequency, the first container control device 406 receives information related to an approved LoRa frequency along with a timestamp from the web server 404. The information related to the approved LoRa frequency along with the timestamp is received in response to the transmitted location information. The flow of the method 500 then proceeds to step 518. If it is determined that the LoRa frequency determination is not successful, the method 500 returns to step 506.

At step 518, when the first container control device 406 loses the cellular connection, the first container control device 406 establishes a new connection with the LoRa server 414. The first container control device 406 establishes the connection with LoRa server 414 via the LoRa gateway 412. The flow of the method 500 then proceeds to step 520.

At step 520, the first container control device 406 determines whether the connection with the LoRa server is successful. The connection is considered as successful if each of the LoRa frequency and the timestamp is valid. If the connection is successful, the flow of the method 500 proceeds to step 522.

At step 522, the first container control device 406 sets an expiration timer or a timestamp of LoRa frequency. The flow of the method 500 then proceeds to step 524. Also, the first container control device 406 detects the availability of the cellular connection after the expiry of the set timer. The expiration timer is refreshed if the first container control device 406 is connected to the LoRa server. The expiration timer only loses time when there is no any available LoRa connection.

At step 524, the first container control device determines whether one or more wireless beacons (e.g., Bluetooth beacons, Wi-Fi beacons, etc.) of the first container control device 406 are available or not. If one or more beacons are available, the flow of the method 500 proceeds to step 526.

At step 526, if the one or more wireless beacons are available, the first container control device 406 broadcasts the approved LoRa frequency and the timestamp to a set of container control devices among the plurality of container control devices that are not connected to the LoRa server 414. The approved LoRa frequency and the timestamp of the container control device 406 is broadcasted to the set of container control devices via one or more wireless beacons of the container control device 406 based on the established connection. The flow of the method 500 then proceeds to step 504.

Further, if the cellular connection is not available at step 506, then the flow of the method 500 proceeds to step 528. At step 528, the container control device 406 determines whether an active LoRa frequency is available by listening to the broadcasted LoRa frequency and a timestamp via the Wi-Fi listener. If any active LoRa frequency is available, the container control device 406 receives the available LoRa frequency, and the method 500 proceeds to step 518. If any active LoRa frequency is not available, the method 500 proceeds to step 530.

At step 530, if any active LoRa frequency is not available via the Wi-Fi listener, the container control device 406 determines whether an active LoRa frequency is available via the Bluetooth listener. If any active LoRa frequency is available, the container control device 406 receives the available LoRa frequency, and the method 500 proceeds to step 518. If any active LoRa frequency is not available, the method 500 proceeds to step 532.

At step 532, if any active LoRa frequency is not available through any one of the Wi-Fi listener or the Bluetooth listener, the container control device 406 waits for a predefined time period. The flow of the method 500 then returns to step 504.

Further, if the LoRa connection is not successful at step 520, then flow of the method 500 returns to step 504. The process performed at the method steps 504 through 532 is repeated while the container control devices are on the AC power or on the internal battery power.

In one or more embodiments, when the container control device 406 is already communicating with the LoRa server 414, and the container control device 406 is moved to a new location, the LoRa Server 414 informs the container control device 406 to switch to the new band. When a new cellular network connection is available, the cellular module 406B establishes a new cellular connection with the new cell tower. Thereafter, the method 500 again restarts from step 520.

Thereafter, the cellular module 406B receives updated location information from the newly connected cell tower via the new cellular connection. The cellular module 406B sends the updated location information to the web server 404. The cellular module 406B then receives, from the web server 404, information related to the newly approved LoRa frequency along with the new timestamp, in response to the sent updated location information. The container control device 406 now connects with the LoRa server 414 using the newly approved LoRa frequency and the new timestamp. The container control device 406 then broadcasts the newly approved LoRa frequency and the new timestamp securely or insecurely via the communication interface 406D using the Bluetooth and/or Wi-Fi broadcaster/transmitter. Other container control devices that are in range and not already connected to the LoRa server will be listening for the newly approved LoRa frequency broadcast that is broadcasted by the communication interface 406D. If the frequency and the timestamp are valid and received timely within the predefined threshold time period, the listening container control devices 408 may utilize the information associated with the valid frequency and the timestamp to make an attempt to connect to the corresponding containers on the vessel 202 with the LoRa server 414. Thus, the newly approved LoRa frequency is propagated through all the container control devices on the vessel 202 which do not have information about the approved LoRa frequency. This process is repeated till the newly approved LoRa frequency is propagated to all the container control devices in/on the vessel 202.

FIG. 6 illustrates a flow chart of a method of LoRa frequency determination and propagation by a first container control device. The one or more steps of the method 600 are executed by the first container control device 406.

The method 600 starts at step 602 when the first container control device 406 establishes a connection to one of the AC power or the internal battery power.

At step 604, the first container control device 406 establishes, when the first container control device 406 is connected to one of the AC power supply or the internal battery power, a cellular connection with the network entity. For example, the first container control device 406 determines whether a cellular connection is available. If the cellular connection is available, the first container control device 406 connects with the cell tower connected with the first container control device 406 using the cellular module 406B. The flow of the method 600 now proceeds to step 606.

At step 606, the first container control device 406 determines, based on the cellular country code associated with the established cellular connection, whether location information of the first container control device 406 is available. For example, the first container control device 406 controls the cellular module 406B to receive the cellular country code from the cell tower connected with the first container control device 406. The first container control device 406 may further control the cellular module 406B to receive the GPS location from the GPS sensor 406A. The flow of the method 600 now proceeds to step 608.

At step 608, the first container control device transmits, in response to the determination that the location information is available, the location information to the web server. For example, the first container control device 406 control the cellular module 406B to send at least one of the received GPS location and the cellular country code to the web server 404. The flow of the method 600 now proceeds to step 610.

At step 610, the first container control device 406 receives from the web server 404, information related to the approved LoRa frequency along with the timestamp, in response to the transmitted location information. For example, the first container control device 406 controls the cellular module 406B to receive the LoRa frequency and the timestamp from the web server 404. The first container control device 406 controls the cellular module 406B based on at least one of the received GPS location and the cellular country code. The flow of the method 600 now proceeds to step 612.

At step 612, the first container control device 406 establishes, via the LoRa gateway 412, a first connection with the LoRa server 414 if each of the approved LoRa frequency and the timestamp is valid. For example, in case the first container control device 406 loses the cellular connection and has information regarding the LoRa frequency and the timestamp, the first container control device 406 establishes a connection with the LoRa server 414 via the LoRa gateway 412. The flow of the method 600 now proceeds to step 614.

At step 614, the first container control device 406 broadcasts the approved LoRa frequency and the timestamp of the first container control device 406 to the first set of container control devices (e.g., 408, 410) among the plurality of container control devices that are not connected to the LoRa server 414. The broadcasting is performed via one or more wireless beacons of the first container control device 406 based on the established LoRa connection. For example, once the first container control device 406 establishes a connection with the LoRa server 414, the LoRa frequency and the timestamp of the first container control device 406 is broadcasted to container control devices 408 and 410 securely or insecurely using the Bluetooth broadcaster and/ or Wi-Fi broadcaster of the communication interface 406D. The LoRa frequency and the timestamp of the first container control device 406 are broadcasted such that other container control devices that are in range of the first container control device 406 and are not already connected to the LoRa server 414 may listen to the broadcasted LoRa frequency and the timestamp via their Bluetooth listener and/or Wi-Fi listeners.

Further, the other container control devices may make an attempt to connect to the LoRa server 414 using the LoRa frequency and the timestamp broadcasted by the first container control device 406. In this way, the approved LoRa frequency may be propagated through all the container control devices that are in the vicinity of the first container control device 406 and do not have information regarding the approved LoRa frequency.

FIG. 7 illustrates a flow chart of a method of LoRa frequency determination and propagation by the second container control device 408. The one or more steps of the method 700 are executed by the second container control device 408.

At step 702, the second container control device 408 receives the LoRa frequency and the timestamp broadcasted by the first container control device 406. For example, when the first container control device 406 establishes a first connection with the LoRa server 414, the LoRa frequency and the timestamp of the first container control device 406 are broadcasted to the container control devices within the reach of the first container control device 406 via the Bluetooth broadcaster and/or the Wi-Fi broadcaster of the communication interface 406D. The second container control device 408 may listen to the LoRa frequency and the timestamp broadcasted by the first container control device 406 and may acquire the LoRa frequency and the timestamp broadcasted by the first container control device 406.

At step 704, the second container control device 408 establishes a connection with the LoRa server 414 if each of the acquired broadcasted LoRa frequency and the timestamp are valid. The flow of the method 700 now proceeds to step 706.

At step 706, the second container control device 408 broadcasts the acquired LoRa frequency and the timestamp to a second set of container control devices among the plurality of container control devices that are not connected to the LoRa server 414. The broadcasting of the acquired LoRa frequency and the timestamp to the second set of container control devices is performed via one or more wireless beacons of the second container control device 408. For example, once the second container control device 408 establishes the second connection with the LoRa server 414, the LoRa frequency and the timestamp of the second container control device 408 are broadcasted to another set of container control devices that are in range of the second container control device 408 and are not already connected to the LoRa server 414. Then, the another set of container control devices may listen to the LoRa frequency broadcasted by the second container control device 408 via the Bluetooth listener and/or the Wi-Fi listener and may try to establish a connection with the LoRa server 414. The steps of the method 700 are repeated until the valid LoRa frequency and the timestamp are propagated to each container control device of the plurality of container control devices in/on the vessel 202.

Figure 8:
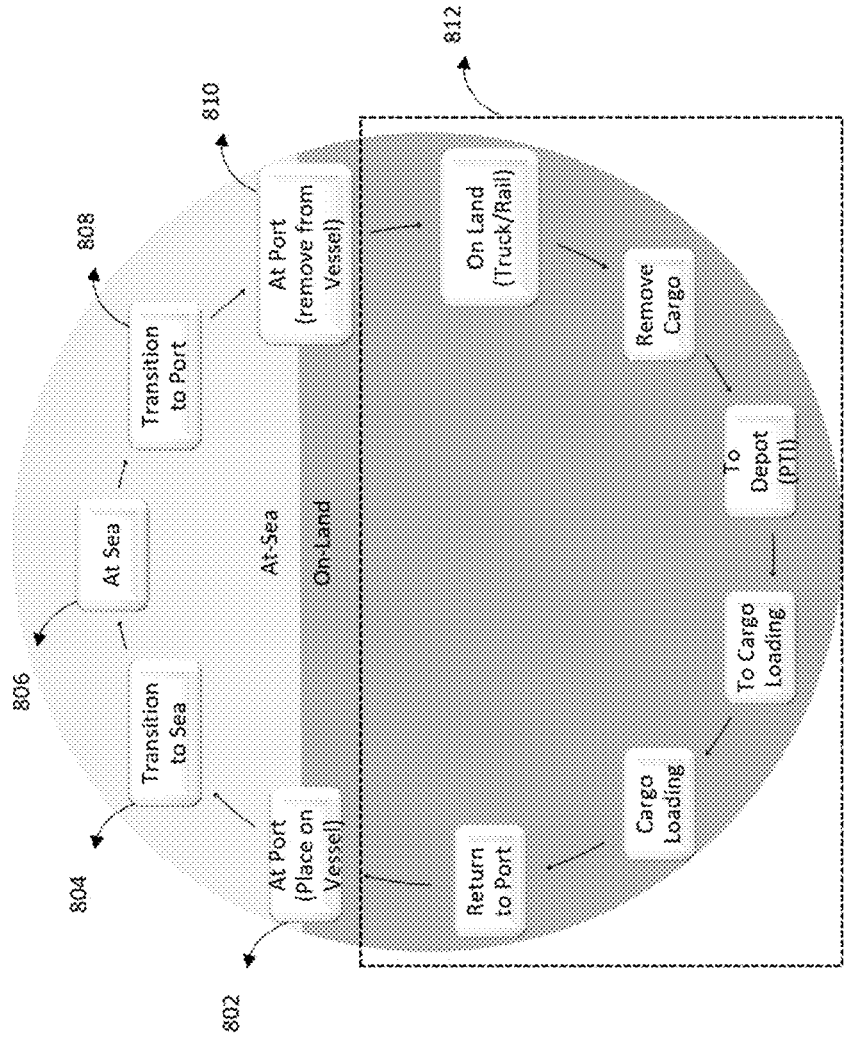
FIG. 8 illustrates a plurality of example scenarios for using LoRa communication depending on different physical locations of container control devices of the control system.

FIG. 8 illustrates a plurality of example scenarios for using the LoRa communication depending on different physical locations of the container control device. In a first scenario 802 of FIG. 8, the plurality of containers 206 is moved from dock to the vessel 202. A first set of containers among the plurality of containers 206 are placed on the vessel's 202 deck. A second set of containers among the plurality of containers 206 are placed inside the vessel hold 204. In the first scenario 802, cellular coverage and GPS locations may be available for the first set of containers and the LoRa connection may not be attempted. Further, the cellular coverage and the GPS may not be available for the second set of containers that are placed inside the vessel hold 204. Therefore the LoRa connection may be attempted for the second set of containers.

Further, in the first scenario 802, when the vessel 202 is at the port, a valid last known LoRa frequency may be used for establishing the LoRa connection. However, when the plurality of containers 206 is moved from the dock onto vessel 202 without any power-on condition and then the plurality of containers 206 is powered-on inside the vessel hold 204, the last known LoRa frequency may not be valid depending upon how far the plurality of containers 206 has traveled. Further, the second set of containers which are placed inside the vessel hold 204 and do not have a valid last known LoRa frequency, obtains the LoRa frequency by listening to the LoRa frequency and the timestamp broadcasted by other containers on the vessel 202 that have the valid LoRa frequency and the timestamp.

In a second scenario 804 as shown in FIG. 8, the vessel 202 makes a transition from the port to the sea. While at the port, the plurality of containers 206 sends their GPS locations to the web server 208 and receives the LoRa frequency information and the timestamp from the web server 208. When the vessel 202 makes the transition from the port to the sea, the cellular coverage may be lost in international waterways. At this point, the LoRa connection may be attempted. Also, at this point, the plurality of containers 206 may utilize the received LoRa frequency information and the timestamp to connect to the LoRa server 210.

In a third scenario 806 as shown in FIG. 8, the vessel 202 is in the sea. In the third scenario 806, the LoRa connection may be attempted by each of the plurality of containers 206 on the vessel's 202 deck as well as inside the vessel hold 204.

In a fourth scenario 808 as shown in FIG. 8, the vessel 202 makes a transition from the sea to the port. In the fourth scenario 808, the first set of containers has established LoRa connection. At this point, each of the GPS locations and the cellular connection may be available for the first set of containers. In such a case, the web server 210 may receive new location information from the first set of containers. Then, the first set of containers may receive a new LoRa frequency from the web server 208. Each of the plurality of containers that are placed upon the vessel's 202 deck and inside the vessel hold 204 may switch to the received new LoRa frequency. Thus, in the event where the container control devices are already communicating with the LoRa server 210 and the container control devices moves to a new location, the LoRa server 210 may inform the container control devices to switch to a new frequency band.

In a fifth scenario 810 as shown in FIG. 8, the vessel 202 reaches the port. At this point, the plurality of containers 206 is moved from the vessel 202 to the dock after being unplugged from the AC power supply. The plurality of containers 206 may be further plugged into the AC power supply when the plurality of containers 206 reaches the dock. The cellular connection may be available at this point of time and no LoRa connection may be attempted.

In a sixth scenario 812 as shown in FIG. 8, the plurality of containers 206 is on the land. At this point, the cellular connection may be available, and the plurality of containers 206 may be connected to the available cellular connection.

Figure 9:
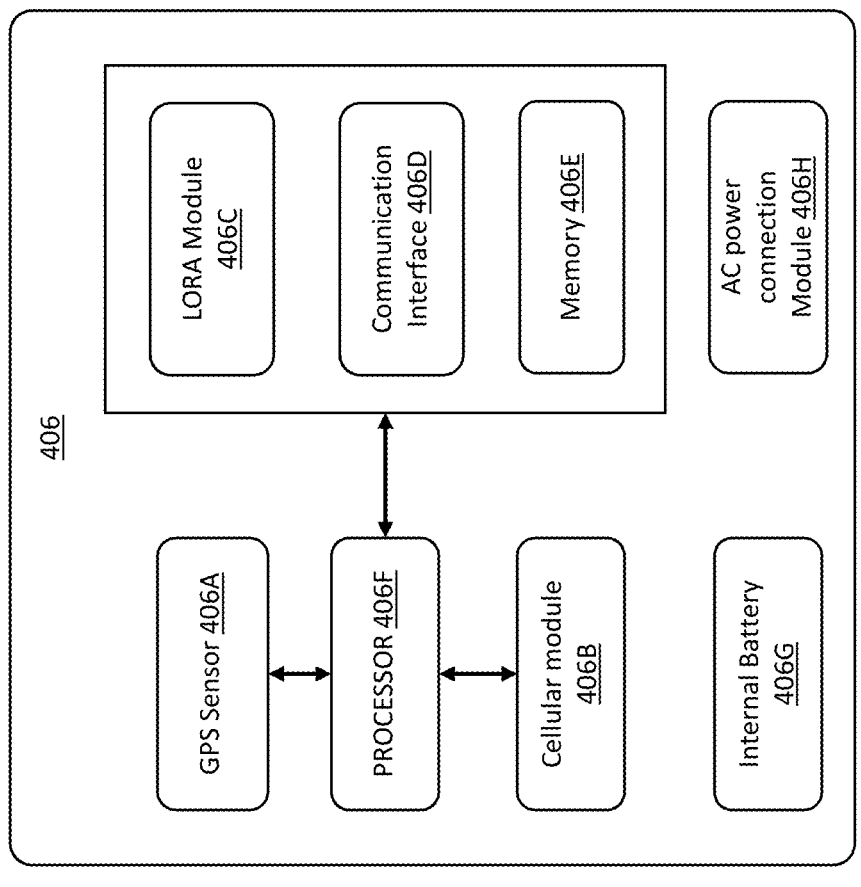
FIG. 9 illustrates a detailed block diagram of the container control device of the control system of FIG. 4.

FIG. 9 illustrates a detailed block diagram of the container control device 406. The container control device 406 includes a GPS sensor 406A, a cellular module 406B, LoRa module 406C, a communication interface 406D, a memory 406E, a processor 406F, an internal battery 406G, and an AC power connection module 406H.

The functionalities of the components including the GPS sensor 406A, the cellular module 406B, the LoRa module 406C, and the communication interface 406D of the container control device 406 are described above with reference to FIG. 4, and therefore, a detailed explanation is omitted herein for the sake of brevity of the disclosure.

The memory 406E may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The processor 406F can be a single processing unit or several units, all of which could include multiple computing units. The processor 406F may be implemented as one or more microprocessors, microcomputers, microcontrollers, digital signal processors, central processing units, state machines, logic circuitries, and/or any devices that manipulate signals based on operational instructions. Among other capabilities, the processor 406F is configured to fetch and execute computer-readable instructions and data stored in the memory 406E. The processor 406F controls the operations of the GPS sensor 406A, the cellular module 406B, the LoRa module 406C, and the communication interface 406D.

The internal battery 406G may include any compatible power source capable of proving power to the container control device to perform minimal functionalities in a case the container control device is not connected to the AC power source. The minimal functionalities may include but not limited to recording sensor data from the GPS sensor 406A and performing communication via the cellular module 406B and the LoRa module 406C. These minimal functionalities may only be performed once an hour to conserve the internal battery 406G power. The AC power connection module 406H provides a connection of the container control device with the AC power source on the dock or on the vessel.

In one or more embodiments, if the LoRa server connection is ever lost and a container control device cannot re-establish the LoRa server connection in a timely manner, then the container control device may not re-attempt to connect to the LoRa server 210 or 414 unless the container control device receives updated location information.

As would be apparent to a person in the art, various working modifications may be made to the method in order to implement the inventive concept as taught herein.

Moreover, the actions of any flow diagram need not be implemented in the order shown; nor do all of the acts necessarily need to be performed. Also, those acts that are not dependent on other acts may be performed in parallel with the other acts.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A control system for frequency determination and propagation in a transport ship, the control system comprising:
a plurality of container control devices;
a long range radio (LoRa) server configured to communicate with the plurality of container control devices; and
a web server configured to communicate with the plurality of container control devices, wherein
a first container control device, from amongst the plurality of container control devices, is configured to:
establish, when the first container control device is connected to one of AC power or internal battery power, a cellular connection with a network entity;
determine, based on a cellular code associated with the established cellular connection, whether location information of the first container control device is available;
transmit, in response to the determination that the location information is available, the location information to the web server;
receive, from the web server, information related to an approved LoRa frequency along with a timestamp, in response to the transmitted location information;
establish, via a LoRa gateway, a first connection with the LoRa server if each of the approved LoRa frequency and the timestamp is valid; and
broadcast the approved LoRa frequency and a timestamp of the first container control device to a first set of container control devices, from amongst the plurality of container control devices, that are not connected to the LoRa server, wherein the broadcasting is performed via one or more wireless beacons of the first container control device based on the established first connection.

2. The control system of claim 1, wherein a second container control device, from amongst the first set of container control devices, is configured to receive the broadcasted LoRa frequency and the timestamp of the first container control device.

3. The control system of claim 2, wherein the second container control device is further configured to:
establish, via the LoRa gateway, a second connection with the LoRa server if each of the received broadcasted LoRa frequency and the timestamp is valid; and
broadcast each of the received LoRa frequency and a timestamp of the second container control device to a second set of container control devices, from amongst the plurality of container control devices that are not connected to the LoRa server, wherein
the broadcast is performed via one or more wireless beacons of the second container control device based on the established second connection, and
the second set of container control devices excludes the first container control device and the second container control device.

4. The control system of claim 1, wherein the first container control device is further configured to:
update the location information, when a new cellular connection is established based on an availability of a new cellular network connection.

5. The control system of claim 4, wherein the first container control device is further configured to:
transmit the updated location information to the web server; and
receive, from the web server, information related to a newly approved LoRa frequency along with a new timestamp, in response to the sent updated location information.

6. The control system of claim 5,
wherein a corresponding container control device of the plurality of container control devices is installed in a corresponding container of a plurality of containers in a vessel, and
wherein the newly approved LoRa frequency and the new timestamp is broadcasted from one container to other containers among the plurality of containers until each of the newly approved LoRa frequency and the new timestamp is propagated throughout the vessel.

7. The control system of claim 1, wherein the first container control device is further configured to:
set a LoRa frequency timer based on the established first connection with the LoRa server; and
detect the availability of the cellular network connection after the expiry of the set LoRa frequency timer.

8. A method for frequency determination and propagation in a transport container system that includes a long range radio (LoRa) server and a plurality of container control devices, the method comprising:
establishing, by a first container control device when a first container control device is connected to one of AC power or internal battery power, a cellular connection with a network entity;
determining, by the first container control device based on a cellular code associated with the established cellular connection, whether location information of the first container control device is available;
transmitting, by the first container control device, in response to the determination that the location information is available, the location information to a web server;
receiving, from the web server by the first container control device, information related to an approved LoRa frequency along with a timestamp, in response to the sent location information;
establishing, by the first container control device via a LoRa gateway, a first connection with the LoRa server if each of the approved LoRa frequency and the timestamp is valid; and
broadcasting, by the first container control device, the approved LoRa frequency and a timestamp of the first container control device to a first set of container control devices, from amongst the plurality of container control devices, that are not connected to the LoRa server, wherein the broadcasting is performed via one or more wireless beacons of the first container control device based on the established first connection.

9. The method as claimed in claim 8, further comprising:
receiving, by a second container control device from amongst the first set of container control devices, the broadcasted LoRa frequency and the timestamp of the first container control device.

10. The method of claim 9, further comprising:
establishing, by the second container control device via the LoRa gateway, a second connection with the LoRa server if each of the received broadcasted LoRa frequency and the timestamp is valid; and broadcasting, by the second container control device, each of the received LoRa frequency and a timestamp of the second container control device to a second set of container control devices, from amongst the plurality of container control devices that are not connected to the LoRa server, wherein the broadcasting is performed via one or more wireless beacons of the second container control device based on the established second connection, and the second set of container control devices excludes the first container control device and the second container control device.

11. The method of claim 8, further comprising:

updating, by the first container control device, the location information, when a new cellular connection is established based on availability of a new cellular network connection.

12. The method of claim 11, further comprising:

transmitting, by the first container control device, the updated location information to the web server; and receiving, by the first container control device from the web server, information related to a newly approved LoRa frequency along with a new timestamp, in response to the sent updated location information.

13. The method of claim 12, wherein a corresponding container control device of the plurality of container control devices is installed in a corresponding container of a plurality of containers in a vessel, and wherein the newly approved LoRa frequency and the new timestamp is broadcasted from one container to other containers among the plurality of containers until each of the newly approved LoRa frequency and the new timestamp is propagated throughout the vessel.

14. The method of claim 11, further comprising:

setting, by the first container control device, a LoRa frequency timer based on the established first connection with the LoRa server; and detecting, by the first container control device, the availability of the cellular network connection after the expiry of the set LoRa frequency timer.

* * * * *